UNITED STATES PATENT OFFICE.

LUCIEN J. P. M. Y. DUPIRE, OF ST. POL, FRANCE.

CATTLE-FOOD AND PROCESS OF MAKING SAME.

SPECIFICATION forming part of Letters Patent No. 713,620, dated November 18, 1902.

Application filed May 19, 1902. Serial No. 108,122. (No specimens.)

*To all whom it may concern:*

Be it known that I, LUCIEN J. P. M. Y. DUPIRE, engineer-chemist, a citizen of the Republic of France, residing in Ramecourt, St. Pol-Ternoise, Pas-de-Calais, France, have invented certain new and useful Improvements in Cattle-Foods and Processes of Making the Same, of which the following is a specification.

This invention relates to improvements in the manufacture of molasses-cakes for feeding cattle, and has for its object to utilize straw, hay, or other vegetable substances generally as a vehicle for the molasses and to permit of obtaining cakes which are clean and pleasant to handle and which contain a large proportion of molasses, which is very advantageous from the alimentary standpoint.

Vegetable substances—such as straw, hay, wood-reeds, bagasse, or the like—contain gummy and resinous constituents which oppose the incorporation of any organic substance, and which consequently prejudicially affect the utilization of vegetable matter as a vehicle for molasses.

The invention consists in freeing these vegetable substances from the whole or a portion of their gummy and resinous constituents in such a manner as to adapt them for the reception of an organic substance, such as molasses.

With this object the vegetable substance—straw, for example—intended to serve as a vehicle for the molasses is submitted to the following treatment: The straw is suitably chopped and boiled for about half an hour in a solution of caustic soda at from 1° to 2° Baumé. The soda is then eliminated by methodical washings. The soda thus separated and charged with gummy and resinous substances is discharged into a furnace of the Porion type, intended to recuperate the soda in the form of carbonate which may be again utilized. When the vegetable substance is freed from its resinous or similar constituents by means of lime, it is allowed to macerate in large vats with about fifteen per cent. of quicklime. This maceration is allowed to continue for several days, either in a cold or a hot state, after which the milk of lime charged with gummy and resinous substances is discharged. In either case the straw treated is thoroughly washed. The water which it contains is then expressed. When this has been done, it may be cut up, crushed, kneaded, and finally reduced to a pulp similar to paper-pulp, or it may be left in the condition of filaments of greater or less length. It is then mixed with molasses, a kneading or other suitable mixing apparatus being employed for this purpose.

The quantity of molasses to be mixed with the straw depends upon the strength of the alkaline solution and upon the duration of the treatment. With the strength of solution and duration of treatment indicated above the quantity of molasses which is capable of incorporation with the vegetable matter is about forty per cent. of the total weight. By prolonging the treatment the proportion may be raised to about sixty per cent. At the same time as the mixture of the molasses with the vegetable matter freed from its resinous constituents is effected (it being then either in the form of pulp or of filaments of greater or less length) there may be incorporated in the mass other substances or products of various kinds—such as bran, flour, &c. The mixture of straw and molasses is then pressed in a suitable press in such a manner as to impart to it a certain cohesion and to form cakes of sufficient consistency and resistance to permit of convenient handling. When the mixture is in the pasty state, it may be advantageously dried in an oven or kiln and submitted to the action of crushers or grinders, which reduce the mass to a powder or flour capable of being put up into sacks and employed in this condition for feeding cattle, although it may be better utilized by mixing it with a fresh quantity of molasses in order to increase the proportion of sugar in its composition. The paste thus obtained is dried and compressed into cakes or agglomerates of any desired form. With this object the mass may be placed in envelops similar to oil-bags and passed through a hydraulic press, for example. The cakes of molasses straw thus obtained constitute a perfect food for cattle and permit of the ready transport of molasses from the place of production to the place of consumption. In order that these cakes may keep well, it is only necessary to dry them in the open air, in an oven, or in any other appropriate manner. There may be incorporated with them ingredients of any kind—such as green forage or peat—for the purpose of either improving their quality or of reducing their cost. Finally, it should be understood that the straw or other vegetable matter may be freed either wholly or in part from its gummy or resinous constituents by any suitable means, those which have been indicated being given by way of example only.

I claim as my invention—

1. The herein-described process of manufacturing cattle-food cakes from vegetable matter, said process consisting of first removing the gummy and resinuous constituents from the vegetable matter, and then mixing a quantity of molasses with the vegetable matter freed from said constituents, substantially as set forth.

2. The herein-described process of manufacturing cattle-food cakes from vegetable matter, said process consisting of subjecting the vegetable matter to the action of alkaline solution to remove the gummy or resinous constituents, washing and pressing the vegetable matter and then intimately mixing it with molasses, as and for the purpose set forth.

3. The herein-described process of manufacturing cattle-food cakes from vegetable matter, said process consisting in freeing the vegetable matter from the gummy and resinous constituents, reducing it to a paste, drying and reducing it to a powder and then mixing with molasses, as and for the purpose described.

4. As a new cattle-food, cakes consisting of vegetable matters freed from gummy or resinous constituents and molasses, the latter constituting from thirty to sixty per cent. of the cake, substantially as described.

In testimony whereof I have signed my name to this specification in the presence of two subscribing witnesses.

LUCIEN J. P. M. Y. DUPIRE.

Witnesses:
EDWARD P. MACLEAN,
BENJAMIN BLOCHE.